United States Patent
Poolla

(10) Patent No.: US 7,212,950 B2
(45) Date of Patent: May 1, 2007

(54) METHODS AND APPARATUS FOR EQUIPMENT MATCHING AND CHARACTERIZATION

(75) Inventor: Kameshwar Poolla, Berkeley, CA (US)

(73) Assignee: OnWafer Technologies, Inc., Pleasanton, CA (US)

( * ) Notice: Subject to any disclaimer, the term of this patent is extended or adjusted under 35 U.S.C. 154(b) by 70 days.

(21) Appl. No.: 10/666,932

(22) Filed: Sep. 17, 2003

(65) Prior Publication Data

US 2004/0131226 A1 Jul. 8, 2004

Related U.S. Application Data

(60) Provisional application No. 60/411,857, filed on Sep. 18, 2003.

(51) Int. Cl.
*G06F 19/00* (2006.01)
(52) U.S. Cl. .................. 702/183; 702/182; 702/84; 700/109
(58) Field of Classification Search .............. 702/56, 702/35, 36, 81–84, 99, 130, 136, 176, 177, 702/173, 127, 187, 189, 182–184; 726/22; 700/119–121, 108–110, 117, 28, 174, 175, 700/177; 374/126, 128
See application file for complete search history.

(56) References Cited

U.S. PATENT DOCUMENTS

| | | | | |
|---|---|---|---|---|
| 5,444,637 A | 8/1995 | Smesny et al. | ............. | 364/556 |
| 5,526,293 A | 6/1996 | Mozumder et al. | ......... | 364/578 |
| 5,557,742 A * | 9/1996 | Smaha et al. | ................ | 726/22 |
| 5,907,820 A | 5/1999 | Pan | ........................ | 702/155 |
| 5,967,661 A | 10/1999 | Renken et al. | ............. | 374/126 |
| 5,969,639 A | 10/1999 | Lauf et al. | ............. | 340/870.17 |
| 6,033,922 A | 3/2000 | Rowland et al. | ............. | 438/14 |
| 6,134,032 A * | 10/2000 | Kram et al. | ................ | 398/17 |
| 6,244,121 B1 | 6/2001 | Hunter | ...................... | 73/865.9 |
| 6,247,151 B1 * | 6/2001 | Poisner | ..................... | 714/718 |
| 6,285,971 B1 | 9/2001 | Shah et al. | .................... | 703/2 |
| 6,542,835 B2 | 4/2003 | Mundt | ........................ | 702/65 |
| 6,594,536 B1 * | 7/2003 | Lin et al. | ...................... | 700/99 |
| 6,642,853 B2 | 11/2003 | Hunter | .................. | 340/870.16 |
| 6,691,068 B1 | 2/2004 | Freed et al. | ................ | 702/187 |
| 6,738,722 B2 | 5/2004 | Poolla et al. | ............... | 702/104 |
| 6,741,945 B2 | 5/2004 | Poolla et al. | ............... | 702/104 |
| 6,907,364 B2 * | 6/2005 | Poolla et al. | ................. | 702/65 |
| 2002/0126872 A1 * | 9/2002 | Brunk et al. | ................ | 382/100 |

OTHER PUBLICATIONS

U.S. Appl. No. 60/469,377, filed May 8, 2003.
U.S. Appl. No. 10/673,049, filed Sep. 26, 2003.

* cited by examiner

*Primary Examiner*—Hal Wachsman
(74) *Attorney, Agent, or Firm*—Larry Williams

(57) ABSTRACT

Computer program products, methods, systems, and apparatus for fingerprinting and process matching process tools such as process tools used for processing workpieces are described. One embodiment includes a method to determine process matching of one or more process tools using a first data set and a second data set. The first data set and the second data set include an operating characteristic for a process. The method comprises fingerprinting the one or more process tools using the first data set and the second data set; finding correspondences between transition points in the first data set and the second data set; and comparing the first data set and second data set using the correspondences to determine whether the first data set and the second data set match so as to indicate whether the one or more process tools match.

20 Claims, 2 Drawing Sheets

METHODS AND APPARATUS FOR EQUIPMENT MATCHING AND CHARACTERIZATION

CROSS-REFERENCES

The present application claims benefit of U.S. Patent Application No. 60/411,857, filed on 18 Sep. 2002. The present application is related to U.S. patent application Ser. No. 09/643,614, filed on 22 Aug. 2000, now U.S. Pat. No. 6,691,068; U.S. patent application Ser. No. 09/816,648, filed on 22 Mar. 2001, now U.S. Pat. No. 6,542,835; U.S. Patent Application Ser. No. 60/285,439, entitled "METHODS, APPARATUS, AND COMPUTER PROGRAM PRODUCTS FOR OBTAINING DATA FOR PROCESS OPERATION, OPTIMIZATION, MONITORING, AND CONTROL," filed 19 Apr. 2001. All of these applications are incorporated herein, in their entirety, by this reference.

BACKGROUND

This invention relates to improved methods, apparatus, and computer program products for applications such as operating and optimizing process equipment, process operations, process recipes for applications such as processing workpieces and performing general process operations. More particularly, embodiments of the present invention relate to processing workpieces for electronic device fabrication and other high value product production.

Some processes for processing workpieces, such as electronic device manufacturing, are extremely complex. Considering, as an example, the application of fabricating electronic devices, the process may involve temperature sensitive processes such as selective deposition and removal of various materials on a workpiece such as a silicon wafer. The manufacture of a typical integrated circuit or chip may involve hundreds of individual processing steps. In order to make integrated circuits reliably and economically, it is essential for each product wafer to experience the same conditions in each of the many process steps. Complex, expensive processing tools of various kinds perform these processing steps. A factory will typically have several tools of each type. As a result, it becomes very desirable to have all the tools of a given type behave as similarly as possible, i.e. that each of these tools match.

Indeed, the problem of getting process tools to provide substantially equivalent process results is well known in industries such as those for fabricating electronic devices such as integrated circuits. Furthermore, tool-matching problems can occur in various situations. For example, after a period of use, the performance results of some process tools drift over time. Consequently, for some applications it is equally important to make sure that this drift is small, or equivalently, that the behavior of a tool on a given day matches with the behavior on another day. Because of the need to have extreme reliability and repeatability, and to have high manufacturing throughput, it is essential that the matching technique be automated by means of a computer program. Moreover, because of the exacting tolerances required of modern integrated circuits, it is important that the matching technique be able to automatically detect small differences between the performances of process tools.

Clearly, there are numerous applications requiring reliable and efficient methods and apparatus for one or more tasks such as fingerprinting, matching, comparing, and automatically characterizing processing tools. In addition, there is a need for methods and apparatus capable of using spatially resolved time-series data for performing such tasks. One example of an important application for the methods and apparatus is the processing of workpieces such as semiconductor wafers, flatpanel displays, and other electronic devices.

SUMMARY

One aspect of the present invention includes a method of performing tasks such as fingerprinting, matching, comparing, and automatically characterizing processing tools. Another aspect of the present invention includes an apparatus for task such as fingerprinting, matching, comparing, and automatically characterizing processing tools. Still another aspect of the present invention includes computer program products for tasks such as fingerprinting, matching, comparing, and automatically characterizing processing tools.

It is to be understood that the invention is not limited in its application to the details of construction and to the arrangements of the components set forth in the following description or illustrated in the drawings. The invention is capable of other embodiments and of being practiced and carried out in various ways that will be clear to persons of ordinary skill in the art in view of the present disclosure. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

Figure 1:
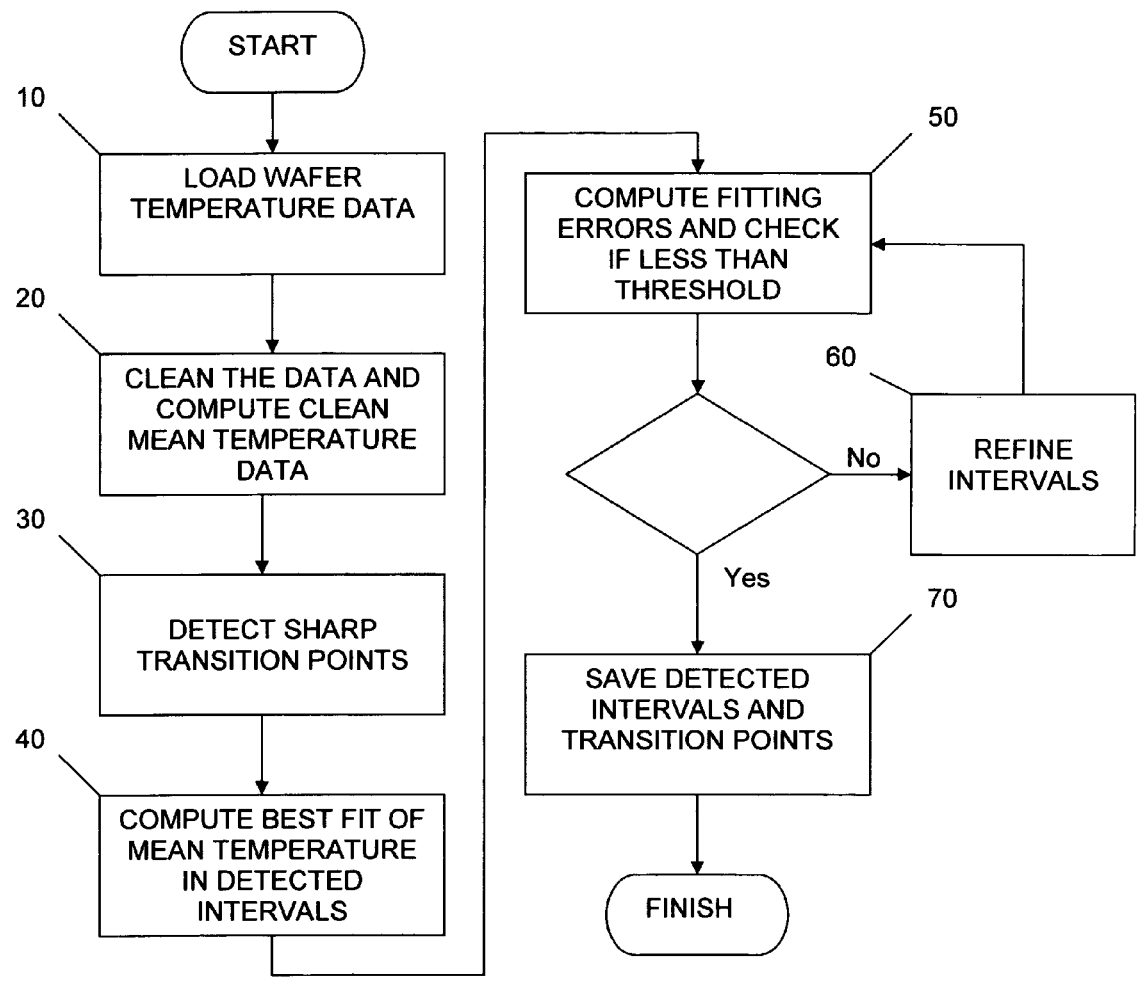
FIG. 1 is a flowchart for an embodiment of the present invention for fingerprinting a process tool.

Skilled artisans appreciate that elements in the figures are illustrated for simplicity and clarity to help improve understanding of embodiments of the present invention.

DESCRIPTION

The operation of embodiments of the present invention will be discussed below, primarily, in the context of finger printing and matching temperature data for temperature sensitive processes for processing semiconductor wafers for fabricating electronic devices. However, it is to be understood that embodiments in accordance with the present invention are not limited to semiconductor wafer processing. Examples of other embodiments of the present invention are flat panel display processing and lithography mask processing.

Furthermore, most of the discussion of embodiments of the present invention is directed toward using temperature data. It is to be understood that embodiments of the present invention can be used for a wide variety of data measurements typically employed for monitoring processes. For applications of semiconductor wafer processing, some examples of other data measurements that can be used for embodiments of the present invention are resistivity, dielectric constant, ion flux, deposition rate, and etch rate.

Still further, it is to be understood that embodiments of the present invention can be used for a wide variety of applications such as post-exposure bake, plasma etching, plasma deposition, plasma enhanced chemical vapor deposition, chemical vapor deposition, and sputter deposition.

In the following description of the figures, identical reference numerals have been used when designating substantially identical elements or steps that are common to the figures.

One embodiment of the present invention fingerprints spatially resolved time-series data and enables the comparison and characterization of several such data records. For one application involving processing workpieces such as semiconductor wafers, the data records include temperature data such as data obtainable using a Sensor Wafer with temperature sensing elements embedded on its top surface and is capable of measuring the workpiece temperature trajectory at various spatial locations; the trajectory comprises an array of data which in this embodiment includes temperature as a function of time. A suitable apparatus for use with some embodiments of the present invention is described in U.S. patent application Ser. No. 09/643,614, filed on 22 Aug. 2000, now U.S. Pat. No. 6,691,068.

Another embodiment of the present invention involves two or more data records. More specifically, a method that involves computing a signature trajectory from each of the data records under consideration. The signature trajectory is then fingerprinted. This means that the signatures are divided into time segments. From one time segment to the next there is a transition point such as a sharp change or other identifiable change in the qualitative behavior of the signature trajectory. Then, for each detected interval, the essential information in the data records is represented using basis functions. Next, to compare several data records, an equitable basis of comparison is provided by comparing or data matching data records so as to find correspondences between transition points in the data and then time stretching the data records to "line-up" appropriately and making a fair basis for comparison. Simple overlaying the data records may not work because various processing steps can be of different durations; this embodiment of the present invention eliminates this problem.

Reference is now made to FIG. 1 where there is shown a flowchart for a fingerprinting algorithm employing a method according to one embodiment of the present invention. The flowchart shown in FIG. 1 represents a preferred embodiment for finger printing process temperatures for a workpiece processed in a process tool. The temperatures of the workpiece vary with time and may also have spatial variations. Other embodiments of the present invention do not require all of the steps shown in FIG. 1; and still other embodiments may include additional steps. The algorithm can be implemented as computer executable steps and may be programmed in apparatus such as a computer, a microprocessor, and an application specific integrated circuit. The algorithm may be stored on computer readable media.

Step 10 includes loading temperature data. For this application, Step 10 involves loading the measured wafer temperature data. In essence, Step 10 involves loading the measured wafer temperature data so that the data are available to the calculation algorithm. Optionally, this may include retrieving temperature measurements from a memory, such as an electronic memory storing the temperature measurements, retrieving temperature measurements from an information transfer interface, or retrieving temperature measurements via a connection with a temperature measuring device. Alternatively, an information input may be provided so that the data can be transferred for access by the calculation algorithm.

Step 20 involves cleaning the data and computing the clean mean temperature. Here, the data is cleaned by removing spikes and outliers or other erroneous data point. This is particularly important for noisy data, as is often the case when measuring process such as plasma etch processes for fabricating electronic devices. Once the data is cleaned, step 20 includes computing a spatial mean temperature; the spatial mean temperature serves as the "signature" for characterizing the data record. In other words, the spatial mean temperature is used when there are spatial variations in the temperature data.

Step 30 involves detecting transition points in the data records; particularly important are sharp transition points. This step involves finding time points at which there is a sudden change in behavior of the signature trajectory. In one embodiment, this is done by numerically differentiating the signature (mean temperature trajectory) and searching for points at which the second derivative exceeds a selected, specified, or predetermined threshold. Preferably, the threshold is automatically chosen based on the overall smoothness of the temperature data.

Step 40 includes computing the best fit of mean temperature in computed intervals. This involves segmenting the signature into the intervals between successive transition points and fitting the signature using a set of basis functions. In this embodiment, the basis functions that are used may be one or more of linear functions, exponentials, double exponentials, sinusoids, polynomials, and other standard basis functions.

Step 50 and Step 60 includes computing fitting errors and checking if these are less than a threshold. The threshold is predetermined and may be selected based on the application. The steps include recursively finding additional sharp transition points as necessary. The criterion used in this embodiment is the fitting error. The technique includes adding a transition point if the fitting error exceeds the threshold, and to continue doing so until the signature trajectory is very well approximated by the basis functions.

Step 70 involves saving transition points and detected intervals. This step completes the fingerprinting of the data record; the data record is compactly represented using basis functions. The key information is stored for subsequent use. The fingerprint has numerous uses. For example, the fingerprint serves as a representation of the process.

Figure 2:
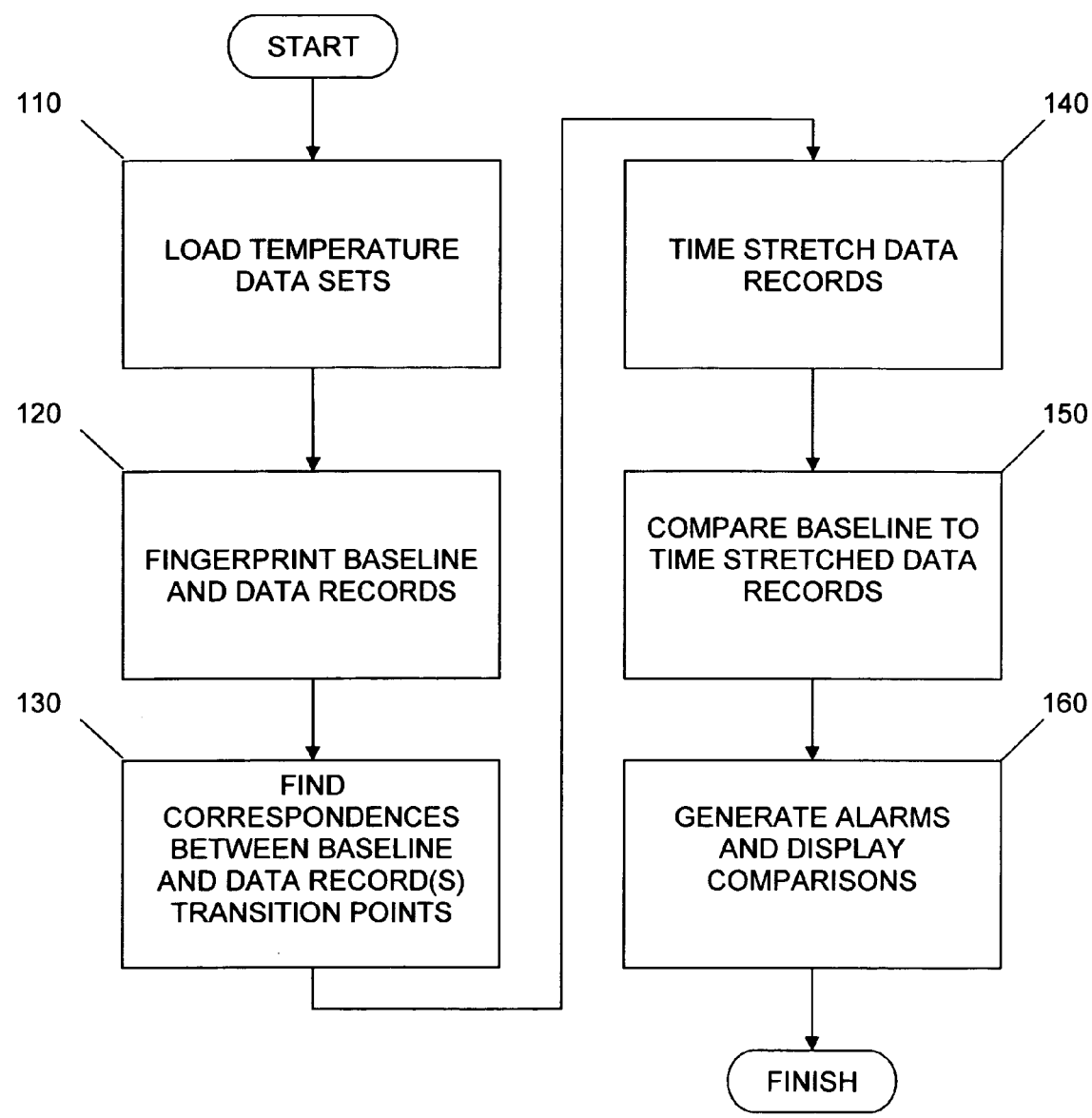
FIG. 2 is a flowchart for an embodiment of the present invention for matching data sets.

Reference is now made to FIG. 2 where there is shown a flowchart for a matching algorithm that includes a method according to one embodiment of the present invention. The algorithm can be implemented as computer executable steps and may be programmed in apparatus such as a computer, a microprocessor, and an application specific integrated circuit. The algorithm may be stored on computer readable media. This embodiment includes a method of matching two temperature data records. The first record is the "baseline" and the second record is called the "data record." In other words, the flow chart shown in FIG. 2 matches the data record to the baseline to determine whether the process and process chamber used to generate the data record match the performance represented by the baseline.

Step 110 includes Loading wafer temperature data sets, the data record and baseline. This involves loading or other techniques for providing the measured wafer temperature data so that the data are available to the calculation algorithm. Optionally, this may include retrieving temperature measurements from a memory storing the temperature measurements, retrieving temperature measurements from an information transfer interface, or retrieving temperature measurements via a connection with a temperature measuring device. Alternatively, an information input may be provided so that the data can be transferred for access by the calculation algorithm.

Step 120 involves fingerprinting the baseline and the data record. Here, the fingerprinting algorithm computes signatures and extract transition points from the signatures of both data sets. In a preferred embodiment, this step includes the steps described for FIG. 1 earlier in this application.

Step 130 includes finding correspondences between transition points in the baseline and the data record. In other words, this step involves finding the correct point of reference for comparing the baseline and the data record.

Step 140 includes time-stretching the data records so that the baseline and the data records can be "lined-up" appropriately to make a correct reference for comparison. In some embodiments, the time-stretching is done for a portion of or all of the data records by inserting interpolated values in the data records so as to produce an equal number of data points in each portion of the data records. For some embodiments of the present invention, time stretching the data records may not be required. More specifically, if the baseline and the data record cover equal time periods, then time stretching is unnecessary.

Step 150 includes comparing the baseline and time stretched data record to determine whether the baseline and the data record match. A criterion or criteria for a determination as to whether a match occurs is preferably predetermined. A preferred criterion is one based on the desired performance of the process tool and/or process. For some embodiments of the present invention, match of the baseline and data record occurs when one or more elements of the fingerprints for the baseline and data record are substantially equal or are sufficiently close so as to meet the criterion.

Step 160 includes generating alarms, if an alarm is needed, and displaying comparison results. The comparison results are the result of step 150. There are numerous options for step 160 that will be clear to one of ordinary skill in the art. The types of alarms and method of display of the results are a matter of designer choice. For some embodiments of the present invention, this step may be unnecessary.

Embodiments of the present invention have many applications. Some examples include, but are not limited to the following. One example is equipment-matching applications so that process tools running the same process produce substantially the same process results. This is an important application such as those that use complex equipment and processes such as plasma equipment for processing semiconductor wafers. Embodiments of the present invention can directly allow a user to evaluate the effectiveness of chucking systems in maintaining uniform temperatures at the wafer surface. It may also allow the user evaluate spatial uniformity and stability of the plasma itself.

Another application is process and/or process chamber diagnostics. The diagnostics may include comparing the process performance for a process tool by matching the fingerprint measured at different times for the process and process tool. Embodiments of the present invention can enable the user to locate and thus identify and aid in correcting problems in, for example, plasma etching equipment and other process used for manufacturing electronic devices. Some examples of problems that can be located are hot spots, local instabilities, chuck inefficiency, etc.

The scheduling of maintenance for process tools is another application for embodiments of the present invention. Fingerprinting the tool, as taught in embodiments of the present invention, provides a measure of performance for a process tool. If the performance of the process tool changes then there will be a corresponding change in the fingerprint. Identifying the change in the fingerprint can be used to determine that the tool requires maintenance. Embodiments of the present invention can be used to determine when maintenance is required so as to maintain production specifications for process tools. Another aspect of tool maintenance includes process drift modeling and prediction.

A preferred embodiment of the present invention comprises a method of performing task such as fingerprinting, matching, comparing, and automatically characterizing semiconductor processing tools using spatially resolved time-series data. Another preferred embodiment of the present invention comprises an apparatus capable of performing tasks such as fingerprinting, matching, comparing, and automatically characterizing semiconductor processing tools using spatially resolved time-series data. Another preferred embodiment of the present invention comprises a computer program product capable of performing tasks such as fingerprinting, matching, comparing, and automatically characterizing semiconductor processing tools using spatially resolved time-series data.

Alternative embodiments of the present invention will be clear to those of ordinary skill in the art in light of the present disclosure. For example, other embodiments of the present invention could use other sensor data such as etch rate, plasma potential, RF power etc. Embodiments of the present invention could use a combination of data from various types of sensors. Embodiments of the present invention can use the fingerprinting method to automatically characterize data records. Embodiments of the present invention can use a variety of curve fitting methods. Embodiments of the present invention can use a variety of basis functions.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A method of determining process matching of one or more process tools so that the one or more process tools running the same process produce substantially the same results for processing workpieces, the method uses a first data set and a second data set where the first data set includes an operating characteristic measured while running the process and the second data set includes the operating characteristic measured while running the process, the method comprising:
   i. fingerprinting the one or more process tools using the first data set and the second data set;
   ii. finding correspondences between transition points in the first data set and the second data set; and
   iii. comparing the first data set and second data set using the correspondences from step ii to determine whether there is process matching for the one or more process tools running the same process;
   wherein step i comprises:
      A. detecting transition points in the first data set and the second data set so as to define data intervals wherein each data interval comprises the data between successive transition points;
      B. computing a best fit of the data in each of the data intervals using basis functions; and
      C. computing fitting errors between the data in the data intervals and the best fit and determining if the errors are less than a predetermined threshold and recursively finding additional transition points as necessary to produce fitting errors less than the threshold.

2. The method of claim 1 further comprising displaying the comparison results from step iii.

3. The method of claim 1 further comprising generating an alarm if there is no process matching.

4. The method of claim 1 wherein the first data set and second data set include the operating characteristic being a function of time; the method further comprising time-stretching at least one portion of the first data set and of the second data set by inserting interpolated values so as to produce an equal number of data points in each portion of the data sets, so that the first data set and the second data set have substantially the same time reference for step iii.

5. The method of claim 1 wherein the process comprises an electronic device fabrication process and the first data set comprises temperatures of a semiconductor wafer as a function of time and the second data set comprises temperatures of a semiconductor wafer as a function of time.

6. The method of claim 1 wherein the process comprises an electronic device fabrication process.

7. A method of process matching one or more semiconductor-wafer-process tools, the method uses a first data set and a second data set where the first data set and the second data set include temperature measurements as a function of time for a process performed in the one or more semiconductor-wafer-process tools, the method comprising:
   i. fingerprinting the one or more semiconductor-wafer-process tools by
      A. detecting transition points in the first data set and the second data set so as to define data intervals wherein each data interval comprises temperature data between successive transition points;
      B. computing a best fit of the temperature data in each of the data intervals using basis functions; and
      C. computing fitting errors between the temperature data in the data intervals and the best fit and determining if the errors are less than a predetermined threshold and recursively finding additional transition points as necessary to produce fitting errors less than the threshold;
   ii. finding correspondences between transition points in the first data set and the second data set; and
   iii. comparing the first data set and second data set using the correspondences from step ii to determine whether the first data set and the second data set match so as to show whether there is process matching of the one or more semiconductor-wafer-process tools.

8. The method of claim 7 further comprising time-stretching at least one portion of the first data set and of the second data set by inserting interpolated values so as to produce an equal number of data points in each portion of the data sets, so that the first data set and the second data set have substantially the same time reference for step iii.

9. A computer readable medium containing executable steps for a method of determining if maintenance is required for a process tool used to perform a process on workpieces, the method uses a first data set and a second data set where the first data set includes an operating characteristic measured while running the process on the process tool and the second data set includes the operating characteristic measured while running the process, the method comprising:
   i. fingerprinting the first data set and the second data set;
   ii. finding correspondences between transition points in the first data set and the second data set; and
   iii. comparing the first data set and second data set using the correspondences from step ii to determine whether the first data set and the second data set match, and indicating maintenance is not required for the process tool if the first data set and second data set match, or indicating maintenance is required for the process tool if the first data set and second data set do not match;
   wherein step i comprises:
      A. detecting transition points in the first data set and the second data set so as to define data intervals wherein each data interval comprises the data between successive transition points;
      B. computing a best fit of the data in each of the data intervals using basis functions; and
      C. computing fitting errors between the data in the data intervals and the best fit and determining if the fitting errors are less than a predetermined threshold and recursively finding additional transition points as necessary to produce fitting errors less than the predetermined threshold.

10. The computer readable medium of claim 9 wherein the data measurements include temperature measurements.

11. The computer readable medium of claim 9 wherein the process comprises an electronic device fabrication process and the first data set comprises temperatures as a function of time and the second data set comprises temperatures as a function of time.

12. The computer readable medium of claim 9 wherein the data measurements include measurements of resistivity, dielectric constant, ion flux, deposition rate, or etch rate.

13. The computer readable medium of claim 9 wherein the first data set and the second data set include data measurements for electronic device fabrication.

14. The computer readable medium of claim 9 wherein the first data set and the second data set include data measurements for flat panel display processing or lithography mask processing.

15. The computer readable medium of claim 9 wherein the first data set and second data set include data measurements as a function of time; the method further comprising time-stretching a portion of the first data set or a portion of the second data set by inserting interpolated values so as to produce an equal number of data points in each portion of the data sets, so that the first data set and the second data set have substantially the same time reference for step iii.

16. The computer readable medium of claim 9 wherein the workpieces comprise a semiconductor wafer and the process is selected from the group consisting of post-exposure bake, plasma etching, plasma deposition, plasma enhanced chemical vapor deposition, chemical vapor deposition, and sputter deposition.

17. The computer readable medium of claim 9 wherein the workpieces comprise a semiconductor wafer for fabricating electronic devices and the data measurements are data measurements for fabricating electronic devices.

18. The computer readable medium of claim 9 wherein the workpieces comprise a semiconductor wafer and the data measurements are selected from the group consisting of etch rate, plasma potential, and RF power.

19. The computer readable medium of claim 9 wherein step A comprises numerically differentiating the data measurements and searching for points at which the second derivative exceeds a predetermined threshold.

20. The computer readable medium of claim 9 wherein step B comprises fitting the data intervals using a set of basis functions that include at least one of linear functions, exponentials, double exponentials, and sinusoids, polynomials, and other standard basis functions.

* * * * *